United States Patent
Yukitake et al.

[11] Patent Number: 6,151,451
[45] Date of Patent: Nov. 21, 2000

[54] DISPLAY ILLUMINATING APPARATUS FOR USE IN CAMERA

[75] Inventors: Namiko Yukitake, Kokubunji; Tsuyoshi Yaji, Kawagoe; Yasuo Tambara, Hino, all of Japan

[73] Assignee: Olympus Optical Co., Ltd., Tokyo, Japan

[21] Appl. No.: 09/320,158

[22] Filed: May 26, 1999

[30] Foreign Application Priority Data

May 29, 1998 [JP] Japan .................................. 10-149267
May 17, 1999 [JP] Japan .................................. 11-135154

[51] Int. Cl.[7] .................................................. G03B 17/18
[52] U.S. Cl. ............................ 396/56; 396/287; 396/303
[58] Field of Search ................................ 396/56, 89, 213, 396/282, 287, 303, 301, 281

[56] References Cited

U.S. PATENT DOCUMENTS

Re. 30,534   3/1981   Harrison ............................ 396/303 X
4,557,578   12/1985   Seely ................................... 396/287 X
5,245,381    9/1993   Takagi et al. ....................... 396/287 X
5,432,578    7/1995   Suzuki ................................. 396/287

OTHER PUBLICATIONS

Patent Abstracts of Japan; Jap. Appln. No. 6–67280 Mar. 11, 1994; Nikon Corp.

*Primary Examiner*—W. B. Perkey
*Attorney, Agent, or Firm*—Frishauf, Holtz, Goodman, Langer & Chick, P.C.

[57] ABSTRACT

This invention provides a display illuminating apparatus for use in a camera, which is operable without generating great noise and hence permits at least the AF and AE operations of the camera to be performed without the influence of noise, and which enables the operator of the camera to confirm the present operation. Information on photography by the camera is displayed on an LCD lit by an EL that is driven by an EL driving circuit. Further, a remote control switch incorporated in a switch input section of the camera sets the camera in a state in which it can receive a remote control signal. Where the camera is set in a remote control mode by the remote control switch, the operation of the EL driving circuit is stopped by an instruction from a CPU, thereby inhibiting lighting of the EL.

10 Claims, 5 Drawing Sheets

DISPLAY ILLUMINATING APPARATUS FOR USE IN CAMERA

BACKGROUND OF THE INVENTION

This invention relates to a display illuminating apparatus for use in a camera, and more particularly to a display illuminating apparatus for illuminating, with electroluminescence, a display device which displays photograph information of a camera.

Liquid crystal display panels, for example, have recently been used in many cases as photograph information display means of cameras. These panels use a light emission diode (LED) or an electroluminescence element (EL) as emission means for rear illumination of the liquid crystal panels.

Japanese Patent Application KOKAI Publication No. 6-67280 discloses a display illuminating apparatus in which a back light consisting of an electroluminescence element is lit using a lighting signal, and extinguished by half pushing its release operation member.

To drive such an EL, it is necessary to use a boosted power voltage. Although a battery such as a lithium ion battery is generally used as the power source of a camera, the EL must be driven by an AC voltage. Moreover, the driving voltage of the EL is higher than the battery voltage. In many cases, the driving voltage is about 100–200V. Thus, to drive the EL, a boosted AC voltage must be used. While boosting a power voltage, however, noise will occur due to changes in power voltage.

Noise that occurs during boosting the power voltage may adversely influence the operations of an auto-focus (AF) system, an auto-exposure (AE) function system, a remote control circuit, etc., which use a fine current.

To avoid such influence, U.S. Pat. No. Re. 30,534, for example, discloses a technique for protecting those systems from the noise. This patent discloses an electronic flash device for a camera, which incorporates a charge control system for inhibiting the charging operation of a flash tube condenser at least during the auto-focusing operation of the camera. This flash device interrupts the charging operation so as to protect, during the auto-focusing operation, the auto-focusing system from the influence of noise generated by the flash unit.

However, U.S. Pat. No. Re. 30,534 does not describe anything about the EL or lighting control for it.

Furthermore, in Japanese Patent Application KOKAI Publication No. 6-67280 first mentioned, all the back light is extinguished where the release operation member is half pushed. Accordingly, the operator of the camera cannot confirm the information on the liquid crystal display panel during the photographing operation.

BRIEF SUMMARY OF THE INVENTION

It is the object of the invention to provide a display illuminating apparatus for use in a camera, which is operable without generating great noise and hence permits at least the AF and AE operations of the camera to be performed without the influence of noise, and which enables the operator of the camera to confirm the present operation.

According to a first aspect of the invention, there is provided a display illuminating apparatus for use in a camera, comprising:
a display section for displaying information concerning photography by the camera;
an illuminating section for illuminating the display section;
a detecting section using a fine current for performing a predetermined detecting operation; and
a lighting control section for inhibiting lighting of the illuminating section before the predetermined detecting operation of the detecting section.

According to a second aspect of the invention, there is provided a display illuminating apparatus for use in a camera, comprising:
a display section for displaying information concerning photography by the camera;
an illuminating section for illuminating the display section;
a detecting section using a fine current for performing a predetermined detecting operation;
a remote control mode setting section for setting the camera in a state in which the camera can receive a remote control signal; and
a lighting control section for inhibiting lighting of the illuminating section before the predetermined detecting operation of the detecting section in the state in which the camera can receive the remote control signal.

According to a third aspect of the invention, there is provided a display illuminating apparatus for use in a camera, comprising:
a display section for displaying information concerning photography by the camera;
an illuminating section for illuminating the display section;
a remote control signal receiving section for receiving a remote control signal;
a remote control signal driving section for driving the remote control signal receiving section;
a remote control mode setting section for setting the camera in a state in which the camera can receive a remote control signal; and
a lighting control section for inhibiting lighting of the illuminating section before the predetermined detecting operation of the detecting section in the state in which the camera can receive the remote control signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described with reference to the accompanying drawings.

Figure 1:
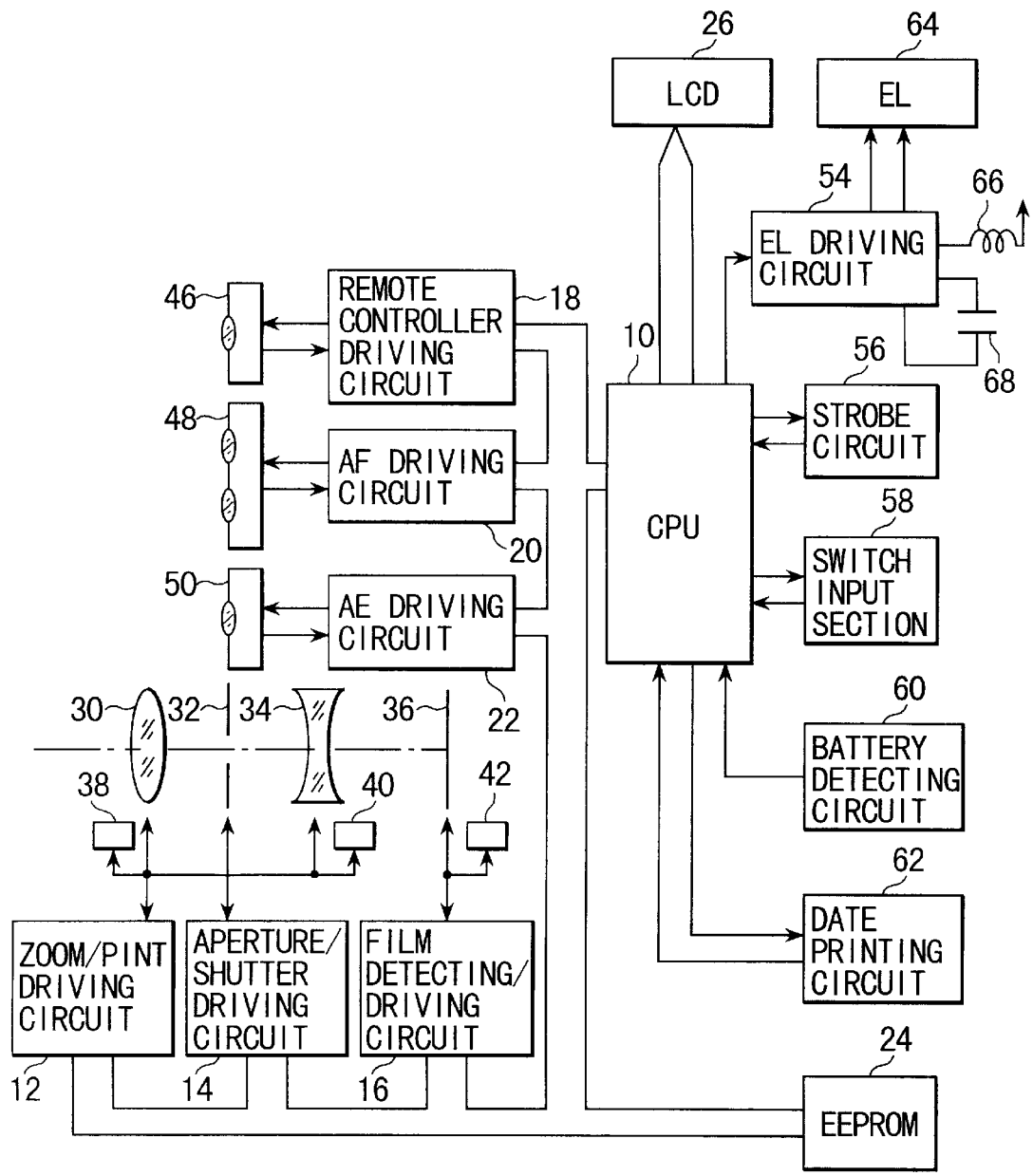
FIG. 1 is a block diagram mainly illustrating the electrical structure of a camera according to a first embodiment of the invention.

FIG. 1 a block diagram mainly illustrating the electrical structure of a camera according to a first embodiment of the invention.

The camera comprises a CPU 10 formed of a microcomputer and serving as control means and display control means for controlling all operations thereof. The CPU 10 is connected to each peripheral circuit, described later, via a control line and a communication line.

Via the communication line, the CPU 10 is connected to a zoom/pint driving circuit 12, an aperture/shutter driving circuit 14, a film detecting/driving circuit 16, remote-controller driving circuit 18, an auto-focus (AF) driving circuit 20, an auto-exposure function (AE) driving circuit 22, an EEPROM 24 and an LCD 26.

The photographing lens of the camera comprises a zoom control optical system 30 for changing the focal distance of the camera, an aperture/shutter driving system 32 for controlling the transmission amount of luminous flux and the transmission/interruption of the flux, and a focus control optical system 34 for adjusting the focus of the camera. A film 36 is situated behind the focus control optical system 34 in a position in which the luminous flux guided through the photographing lens is converged.

The focal distance (zoom position) or the barrel-collapsed position of the zoom control optical system 30 is detected by a zoom/barrel-collapsed-position detecting circuit 38 as detection means, while the focus position of the focus control optical system 34 is detected by a focus position detecting circuit 40 as another detection means.

The zoom control optical system 30, the focus control optical system 34, the zoom/barrel-collapsed-position detecting circuit 38 and the focus position detecting circuit 40 are driven by the zoom/pint driving circuit 12 as photographing lens driving means. Further, the aperture/shutter driving system 32 is driven by the aperture/shutter driving circuit 14 as another photographing lens driving means.

As described above, the zoom/pint driving circuit 12 and the aperture/shutter driving circuit 14 are connected to the CPU 10 via the communication line to be driven by the CPU 10.

A film-state detecting circuit 42 as detection means detects whether or not the film 36 is loaded, the type of the film, the position of the film, etc. The film 36 and the film-state detecting circuit 42 are driven by the film detecting/driving circuit 16. The film detecting/driving circuit 16 is also connected to the CPU 10 via the communication line.

This camera can be controlled by a remote controller. Specifically, the camera has a remote control signal receiving section 46 for receiving an infrared optical signal emitted from an external remote controller (not shown) provided for the camera. The remote control signal receiving section 46 is driven by a remote controller driving circuit 18 connected to the CPU 10 via the communication line.

The infrared optical signal is emitted from an infrared emission diode toward the camera side. This signal is in the form of pattern light with a predetermined code created by the on/off operation of the infrared emission diode. The pattern light is received by the remote control signal receiving section 46 of the camera, where the light is filtered, then amplified to a signal amplitude about 200 times the original one, and converted into a digital signal, whereby its transmission code is recognized. If the infrared optical signal is emitted from the remote controller where the surroundings are very bright or the remote controller is situated far away from the camera, the S/N ratio of the received signal is low. If, at this time, the circuit noise of the remote control signal receiving section 46 is high, the infrared optical signal is liable to be erroneously detected.

Similarly, a ranging unit 48 and a photometry unit 50 are driven by the AF driving circuit 20 and the AE driving circuit 22, respectively. The AF driving circuit 20 and the AE driving circuit 22 are connected to the CPU 10 via the communication line.

The EEPROM 24 as storage means stores various types of adjustment information, photographing information, etc. The CPU 10 controls reading of data from and writing of data into the EEPROM 24 via the communication line.

The CPU 10 is further connected, via the control line, to an electroluminescence element (EL) driving circuit 54, a strobe circuit 56, a switch input section 58, a battery detecting circuit 60 and a date printing circuit 62.

The EL driving circuit 54 drives an electroluminescence element (EL) 64 as display illuminating means. The EL 64 is located on the reverse surface of the LCD 26 as display means, and controlled by the CPU 10 via the EL driving circuit 54. The EL driving circuit 54 is connected to an inductor 66 and a capacitor 68 for determining an EL driving voltage and an EL driving frequency.

The strobe circuit 56 is provided for emitting assisting light to a to-be-photographed object. The switch input section 58 is detection means that comprises a power switch, a mode switch including a zoom mode switch, a flash selecting switch, a release switch, a data selecting/setting switch, a zoom switch, a rewinding switch, a remote control switch, etc.

The battery detecting circuit 60 is detection means for detecting, for example, the remaining battery amount of the camera. The date printing circuit 62 is provided for printing the date, time, etc. of photographing on the film 36.

Figure 2:
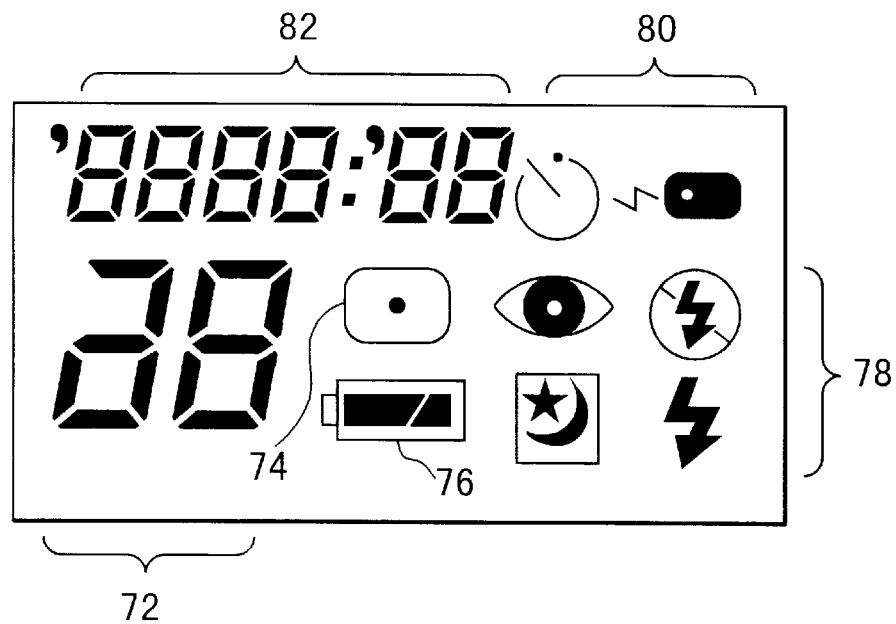
FIG. 2 is a view illustrating an example of the display contents of an LCD 26 appearing in FIG. 1.

FIG. 2 is a view showing an example of the display contents of the LCD 26.

In FIG. 2, a display section 72 consists of seven segments that can display a number less than 40. Where the film 36 is loaded in the camera, the display section 72 displays the number of exposed film frames. On the other hand, where no film is loaded or while auto-loading is performed, the display section 72 displays sign "e". Further, while the film 36 is rewound, the section 72 displays the number of the remaining frames of the film.

A display section 74 displays a photometry mode. A photometry sensor (not shown) provided in the photometry unit 50 has a divided light receiving area corresponding to the screen of the camera. The photometry sensor can select one of spot photometry mode and weighted average photometry mode. The display section 74 for displaying the photometry mode displays a selected one of the spot photometry mode and the weighted average photometry mode.

A display section 76 displays the remaining capacity of the battery, using, for example, three level values. Specifically, the remaining battery capacity is indicated by one of a photographing able level indicating that a sufficient capacity still remains, a remaining capacity warning level indicating that the remaining capacity is as small as or less than a predetermined value, and a photographing unable level indicating that the remaining capacity is less than a level which enables photographing.

A display section 78 displays a flash mode and a photographing mode selected at the present stage. Specifically, it displays an auto emission mode, a red-eye-effect reducing emission mode, a night-view photographing mode, a night-view photographing emission mode, a forced emission mode, an emission interrupting mode, etc.

A display section 80 displays a self-timer photographing mode or a remote control photographing mode if it is selected at the present stage. A display section 82 displays the present date, time, etc. The data displayed on the display section 82 is printed onto the film 36 by the date printing circuit 62.

Figure 3:
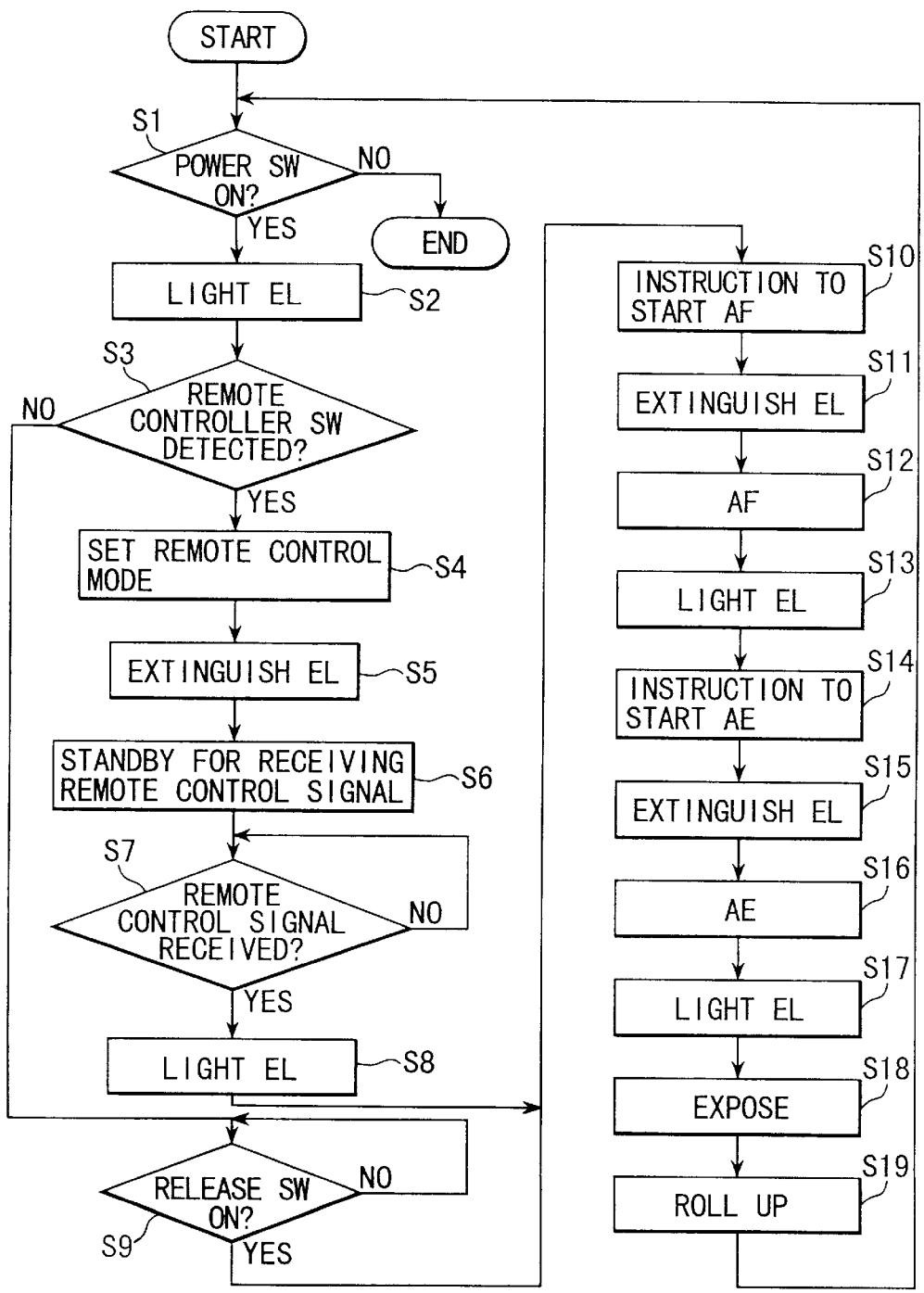
FIG. 3 is a flowchart useful in explaining the operation of the camera according to the first embodiment of the invention.

Referring then to the flowchart of FIG. 3, the operation of the camera according to the first embodiment will be described.

First, it is determined at a step S1 whether or not a power switch (not shown) incorporated in the switch input section 58 is in a pushed state (i.e. in an ON state). If the power switch is in an OFF state, the sequence of the process is finished, whereas if the power switch is in the ON state, the program proceeds to a step S2. At the step S2, the EL driving circuit 54 is driven by an instruction from the CPU 10, thereby lighting the EL 64.

At the next step S3, it is determined whether or not the remote control switch (SW) is detected. Unless the remote control switch is detected, the program proceeds to a step S9, which will be described later. If, on the other hand, the remote control switch is detected, the program proceeds to a step S4.

Then, it is determined at a step S4 that the camera mode has entered a remote control mode, thereby setting the remote control mode using a mode switch (not shown) incorporated in the switch input section 58. Subsequently, the EL 64 is extinguished at a step S5.

At the next step S6, the remote control signal receiving section 46 is shifted to a reception state for receiving a remote control signal from a remote controller (not shown). Subsequently, at a step S7, the reception state is continued until the section 46 receives the remote control signal. Upon receiving the remote control signal, the EL 64 is lit at a step S8, and the program proceeds to a step S10. If, on the other hand, the remote control switch is not detected at the step S3, the camera is kept standby until a release switch (not shown) is turned on at the next step S9. After the release switch is turned on, the program proceeds to the step S10.

After an instruction to start the AF operation is made at a step S10, the EL is extinguished at a step S11. When at a step S12, the AF operation has been completed by the ranging unit 48 and the AF driving circuit 20, the EL 64 is lit again at a step S13.

After that, an instruction to start the AE operation is made at a step S14. At the next step S15, the EL 64 is extinguished, and then at a step S16, the AE operation is performed by the photometry unit 50 and the AE driving circuit 22.

After the AE operation is completed, the EL 64 is lit at a step S17. Then, an exposure operation is performed at a step S18, and the film 36 is rolled up by one exposed frame at a step S19. After that, the program returns to the step S1.

In the above-described embodiment, the order of the AF operation process of the steps S10–S12 and the AE operation process of the steps S14–S16 may be changed. In other words, the AF operation process may be performed after the AE operation process.

Although in the embodiment, the EL 64 is extinguished until the remote control signal receiving section 46 receives the remote control signal where the remote control mode is set, the invention is not limited to this. It may be modified such that the EL 64 is lit even while the section 46 stands by for receiving the remote control signal, or such that the standby state for receiving the remote control signal and the lighting of the EL are alternately repeated. In the latter case, the remote control signal receiving section 46 cannot receive the remote control signal while the EL is lit. Since, however, the period in time for lighting the EL can be set short, and the section 46 can receive the remote control signal after the short lighting time of the EL, there is no great trouble in executing the latter case.

As described above, in the first embodiment, the EL is turned off when driving the AF system, the AE system or the remote control circuit, which uses a fine current. Therefore, the camera of the first embodiment is free from the influence of noise that will occur when the power voltage is boosted.

Figure 4:
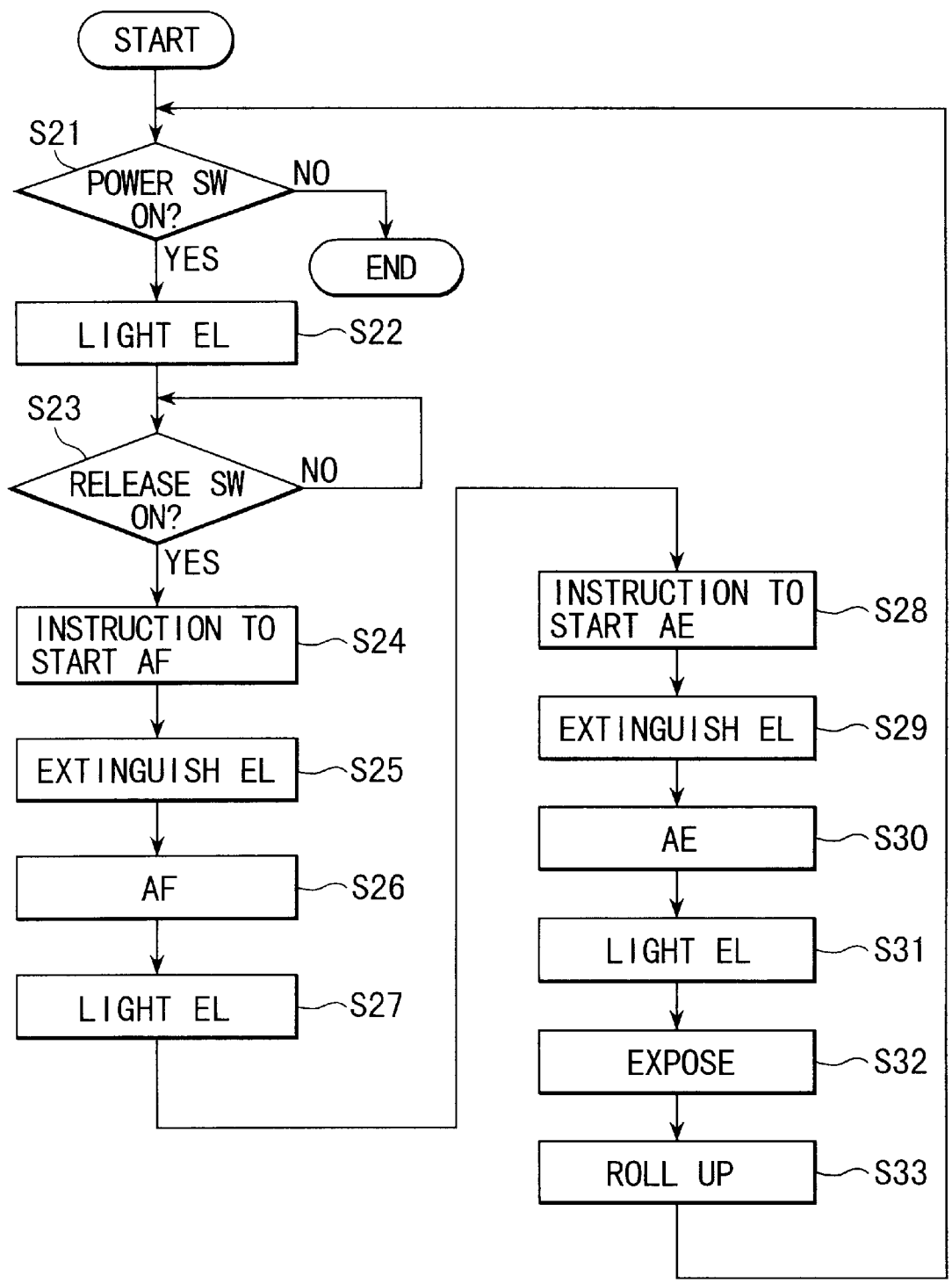
FIG. 4 is a flowchart useful in explaining the operation of a camera according to a second embodiment of the invention.

Referring then to the flowchart of FIG. 4, the operation of a camera according to a second embodiment will be described.

First, it is determined at a step S21 whether or not a power switch (not shown) incorporated in the switch input section 58 is in a pushed state (i.e. in an ON state). If the power switch is in an OFF state, the sequence of the process is finished, whereas if the power switch is in the ON state, the program proceeds to a step S22.

At the step S22, the EL driving circuit 54 is driven by an instruction from the CPU 10, thereby lighting the EL 64. The EL 64 is kept lit until it is determined at the next step S23 that a release switch (not shown) is turned on.

If it is determined at the step S23 that the release switch is turned on, the program proceeds to a step S24 where an instruction to start the AF operation is made. As a result, the EL 64 is turned off at a step S25. When the AF operation has been completed by the ranging unit 48 and the AF driving circuit 20 at the next step S26, the EL 64 is again lit at a step S27.

At the next step S28, an instruction to start the AE operation is made. Then, the EL 64 is extinguished at a step S29, and photometry is performed by the photometry unit 50 and the AE driving circuit 22 at a step S30.

After the AE operation is performed, the EL 64 is lit at a step S31. An exposure operation is performed at a step S32, and the film 36 is rolled up by one exposed frame at a step S33. After that, the program returns to the step S21.

Figure 5:
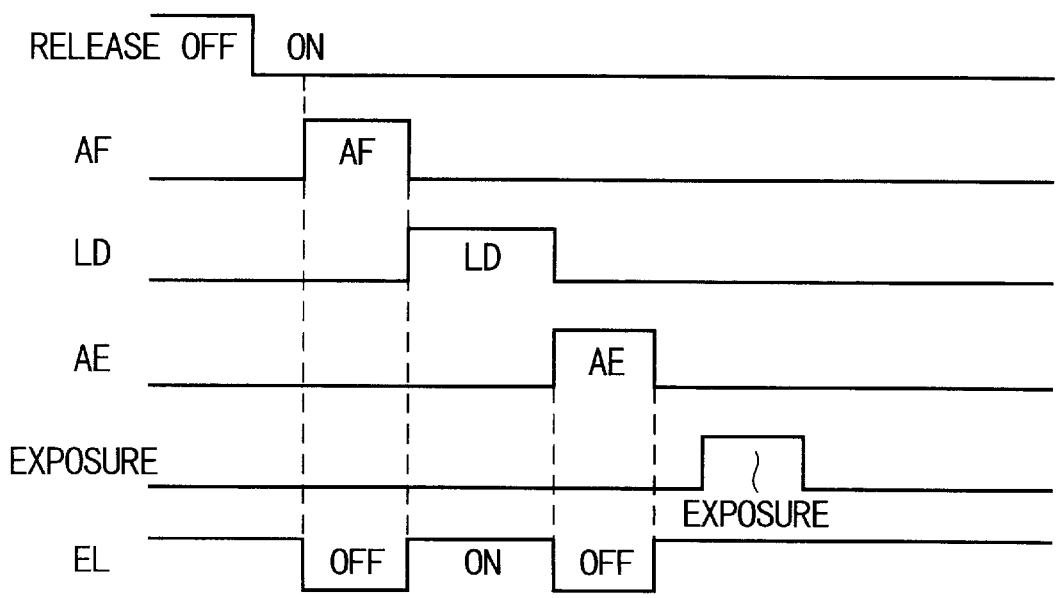
FIG. 5 is a timing chart useful in explaining the operation of the camera according to the second embodiment.

FIG. 5 is a timing chart useful in explaining the operation of the camera of the second embodiment.

As is shown in FIG. 5, the AF system is operated after the release switch is turned on and the EL 64 is extinguished or turned off. When the operation of the AF system has been completed, the EL 64 is turned on, and a photographing lens is driven (LD ON) by the zoom/pint driving circuit 12.

After that, the EL 64 is again turned off, and the AE system is operated. After the completion of the operation of the AE system, the EL 64 is turned on and then the exposure operation is performed.

In the above-described second embodiment, the order of the AF operation process of the steps S24–S26 and the AE operation process of the steps S28–S30 may be changed. In other words, the AF operation process may be performed after the AE operation process.

As described above, in the second embodiment, the EL is turned off when driving the AF system or the AE system, which uses a fine current. Therefore, the camera of the second embodiment is free from the influence of noise that will occur when the power voltage is boosted.

Figure 6:
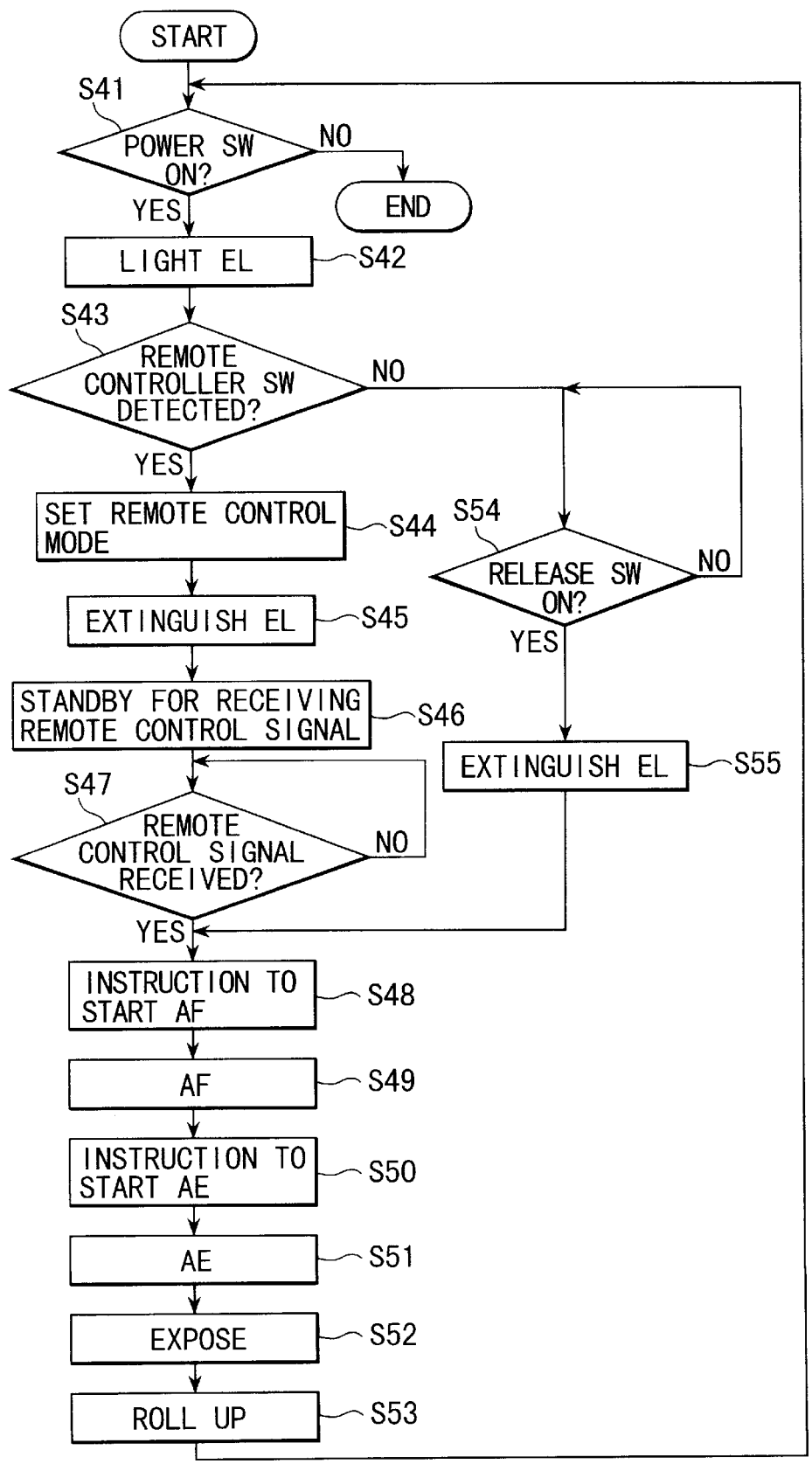
FIG. 6 is a flowchart useful in explaining the operation of a camera according to a third embodiment of the invention.

Referring then to the flowchart of FIG. 6, the operation of a camera according to a third embodiment will be described.

First, it is determined at a step S41 whether or not a power switch (not shown) incorporated in the switch input section 58 is in a pushed state (i.e. in an ON state). If the power switch is in an OFF state, the sequence of the process is finished, whereas if the power switch is in the ON state, the program proceeds to a step S42.

At the step S42, the EL 64 is lit by the EL driving circuit 54 on the basis of an instruction from the CPU 10. Subsequently, it is determined at a step S43 whether or not the remote control switch (SW) is detected.

Unless the remote control switch is detected, the program proceeds to a step S54, which will be described later. If, on the other hand, the remote control switch is detected, the program proceeds to a step S44, where it is determined that the camera mode has entered a remote control mode, thereby setting the remote control mode using a mode switch (not shown) incorporated in the switch input section 58. At a step S45, the EL 64 is once extinguished.

At the next step S46, the remote control signal receiving section 46 is shifted to a reception state for receiving a remote control signal from a remote controller (not shown). Subsequently, at a step S47, the reception state is continued until the section 46 receives the remote control signal.

After the section 46 receives the remote control signal, an instruction to start the AF operation is made at a step S48. Then, at a step S49, the AF operation is performed by the ranging unit 48 and the AF driving circuit 20.

After the completion of the AF operation, an instruction to start the AE operation is made at a step S50. Then, at a step S51, the AE operation is performed by the photometry unit 50 and the AE driving circuit 22.

After the AE operation is completed, an exposure operation is performed at a step S52, and the film 36 is rolled up by one exposed frame at a step S53. After that, the program returns to the step S41.

On the other hand, if the remote control switch is not detected at the step S43, it is determined that the camera is in the normal mode, and the program proceeds to a step S54. At the step S54, the camera is kept in the standby state until a release switch (not shown) is turned on. After the release switch is turned on, the program proceeds to a step S55, where the EL 64 is extinguished. After that, the program goes to the step S48.

In the above-described embodiment, the order of the AF operation process of the steps S48 and S49 and the AE operation process of the steps S50 and S51 may be changed. In other words, the AF operation may be performed after the AE operation.

As described above, in the third embodiment, the EL 64 is turned off before driving the AF system, the AE system or the remote control circuit, which uses a fine current, and is turned on after driving them. Therefore, the camera of the embodiment is free from the influence of noise that will occur when the power voltage is boosted.

Thus, the display illuminating apparatus for use in a camera according to the invention is free from noise at least when operating the AF or AE, and can confirm the operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display illuminating apparatus for use in a camera, comprising:

a display section for displaying information concerning photography by the camera;

an illuminating section for illuminating the display section;

a detecting section using a fine current for performing a predetermined detecting operation;

a remote control mode setting section for setting the camera in a state in which the camera can receive a remote control signal; and a lighting control section for inhibiting lighting of the illuminating section before the predetermined detecting operation of the detecting section in the state in which the camera can receive the remote control signal.

2. A display illuminating apparatus according to claim 1, wherein the lighting control section causes the illuminating section to be lit after the detecting section finishes the predetermined detecting operation.

3. A display illuminating apparatus according to claim 1, wherein the detecting section includes at least one of a ranging section for performing a ranging operation, a photometry section for performing photometry, and a remote controller section for detecting the remote control signal.

4. A display illuminating apparatus according to claim 1, wherein the illuminating section is formed of an electroluminescence element.

5. A display illuminating apparatus according to claim 1, wherein the lighting control section causes the illuminating section to be intermittently lit, in the state in which the camera can receive the remote control signal.

6. A display illuminating apparatus for use in a camera, comprising:
- a display section for displaying information concerning photography by the camera;
- an illuminating section for illuminating the display section;
- a remote control signal receiving section for receiving a remote control signal;
- a remote control signal driving section for driving the remote control signal receiving section;
- a remote control mode setting section for setting the camera in a state in which the camera can receive a remote control signal; and
- a lighting control section for inhibiting lighting of the illuminating section before the predetermined detecting operation of the detecting section in the state in which the camera can receive the remote control signal.

7. A display illuminating apparatus according to claim 6, wherein the lighting control section causes the illuminating section to be lit after the detecting section finishes the predetermined detecting operation.

8. A display illuminating apparatus according to claim 6, wherein the detecting section includes at least one of a ranging section for performing a ranging operation, a photometry section for performing photometry, and a remote controller section for detecting the remote control signal.

9. A display illuminating apparatus according to claim 6, wherein the illuminating section is formed of an electroluminescence element.

10. A display illuminating apparatus according to claim 6, wherein the lighting control section causes the illuminating section to be intermittently lit, in the state in which the camera can receive the remote control signal.

* * * * *